United States Patent [19]

Young et al.

[11] Patent Number: 5,757,779
[45] Date of Patent: May 26, 1998

[54] AUTOMATIC SKYWAVE COMMUNICATIONS SYSTEM

[75] Inventors: Charles D. Young; Daniel O. Weddle, both of Plano; Mel G. Bebee, Richardson, all of Tex.

[73] Assignee: Rockwell International Corporation, Costa Mesa, Calif.

[21] Appl. No.: 796,058

[22] Filed: Feb. 4, 1997

Related U.S. Application Data

[63] Continuation of Ser. No. 468,676, Jun. 6, 1995, abandoned.
[51] Int. Cl.⁶ .................................................. H04J 1/16
[52] U.S. Cl. .................. 370/252; 370/330; 370/438; 370/344; 455/62; 455/68
[58] Field of Search .............................. 370/252, 310, 370/311, 313, 314, 328, 239–332, 438, 498, 522, 524, 468, 478, 341, 342, 343, 344; 455/68, 69, 71, 62, 67.4

[56] References Cited

U.S. PATENT DOCUMENTS

| | | | |
|---|---|---|---|
| 4,937,822 | 6/1990 | Weddle et al. | 370/124 |
| 5,204,855 | 4/1993 | Bebee et al. | 370/50 |
| 5,204,856 | 4/1993 | Bebee et al. | 370/50 |
| 5,359,595 | 10/1994 | Weddle et al. | 370/50 |
| 5,371,901 | 12/1994 | Reed et al. | 455/69 |
| 5,381,443 | 1/1995 | Borth et al. | 370/95.1 |
| 5,386,588 | 1/1995 | Yasuda | 455/69 |
| 5,420,851 | 5/1995 | Seshadri et al. | 370/95.1 |
| 5,452,290 | 9/1995 | Mihm, Jr. | 370/95.1 |
| 5,471,650 | 11/1995 | Vexler et al. | 455/69 |
| 5,481,537 | 1/1996 | Cristler et al. | 370/95.1 |
| 5,487,180 | 1/1996 | Ohtake | 455/69 |
| 5,504,750 | 4/1996 | Fulghum et al. | 370/95.1 |
| 5,513,183 | 4/1996 | Kay et al. | 370/337 |

*Primary Examiner*—Benedict V. Safourek
*Assistant Examiner*—Seema S. Rao
*Attorney, Agent, or Firm*—Kyle Eppele; L. Keith Stephens; James P. O'Shaughnessy

[57] ABSTRACT

A automatic skywave communications system includes a control channel and one or more traffic channels for voice or data communications. The system automatically establishes and maintains traffic radio links. The system measures, reacts, signals and adapts system parameters.

3 Claims, 2 Drawing Sheets

AUTOMATIC SKYWAVE COMMUNICATIONS SYSTEM

This application is a continuation of application Ser. No. 08/468,676, filed Jun. 6, 1995, now abandoned.

BACKGROUND OF THE INVENTION

Skywave communications systems are defined by communication which is supported by ionized regions above the earth. Such communication is characteristic of high frequency (HF) but may also occur at higher frequencies, typically designated as very high frequency (VHF). Radio systems employing ionospheric propagation to provide long distance communications connectivity, depend upon operator skill to maintain the connectivity by coordinating and making adjustment to system parameters. Skilled operators are a limited resource, therefore there is an increased need for a system that automatically adjusts system parameters. Eliminating the need for skilled operators makes it possible for systems to adaptively change parameters previously too complex for operators, thus resulting in improved system performance.

A need has thus arisen for an improved skywave communications system which automatically adjusts system parameters.

SUMMARY OF THE INVENTION

In accordance with the present invention, an automatic skywave communications system is provided. The system includes a control channel and one or more traffic channels for voice or data communications. The system automatically establishes and maintains traffic radio links. The system measures, reacts, signals and adapts system parameters.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

The specifications and drawings of U.S. Pat. Nos. 4,937,822; 5,204,855; 5,204,856; and 5,359,595 are hereby incorporated by reference into the present specification.

Figure 1:
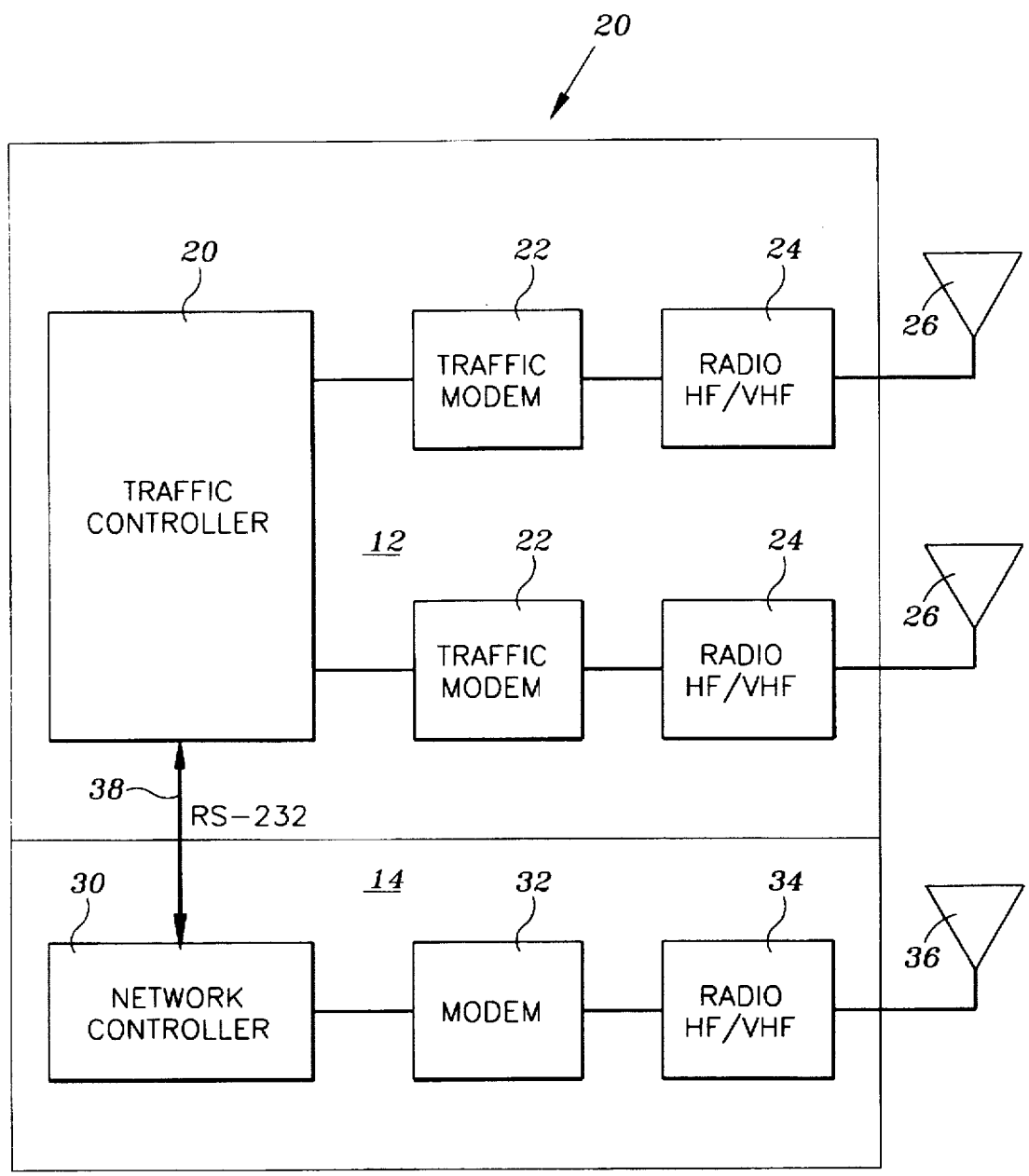
FIG. 1 is a block diagram of the present system.

FIG. 1 illustrates a block diagram of the present automatic skywave communications system, which is generally identified by numeral 10. System 10 includes a traffic channel, generally identified by numeral 12 and a control channel generally identified by the numeral 14.

Traffic channel 12 includes a traffic controller 20 for supplying voice or data communications to traffic modems 22. Modems 22 supply signals to radios 24 which supply outputs to antennas 26. The signal paths between traffic controller 20, modems 22, radios 24, and antennas 26, are bi-directional. Control channel 14 includes a network controller 30 for supplying signals to a modem 32. Modem 32 supplies signals to a radio 34 which supplies outputs to an antenna 36. Signal paths between controller 30, modem 32, radio 34, and antenna 36 are bi-directional. Traffic controller 20 and network controller 30 communicate via a communications link 38.

Controller 30 performs adaptive control functions for modems 22 and 32 and radios 24 and 34. Traffic controller 20, modems 22, and radios 24 are dedicated to passing user traffic. An automatic repeat request protocol is implemented in traffic controller 20. The function of establishing and maintaining connectivity for all radios 24 and 34 is that of network controller 30. Network controller 30 also provides for selecting data rates, frequencies, waveforms, and power levels for radios 24 and 34 as well as other system parameters, such as, for example, antennas 26 and 36 take-off angle and azimuth heading.

The concept of automatic operation based on the adaptive nature of control channel 14 requires that control channel 14 be capable of providing near real time link quality analysis for the path of interest and reliability in sending and receiving control information.

Control channel 14 utilizes frequency hopping time division multiple access (TDMA) packet network having a basic forty-eight second minor cycle architecture as described in U.S. Pat. No. 4,937,822. This architecture divides time into transmit and receive slots for each of, for example, four directly connected neighboring nodes. Each forty-eight second minor cycle contains a five second transmit and a five second receive slot for each of the four neighbors plus four spare slots two seconds in duration. During each minor cycle, each terminal control channel 14 performs spectrum probing to evaluate propagation between neighboring nodes. Also, during each minor cycle, each terminal is capable of passing data traffic to each of its four neighboring nodes over traffic channel 12, with positive acknowledgments. The data traffic over traffic channel 12 can be originated by traffic controller 20, which provides a mechanism by which control channel 14 can automatically coordinate changes for traffic channel 12, modems 22, and radios 24.

Control channel 14 provides the link quality analysis and all signaling and coordination needed to maintain frequency, data rate, waveform, and power for traffic channel 12 as well as for control channel 14.

Figure 2:
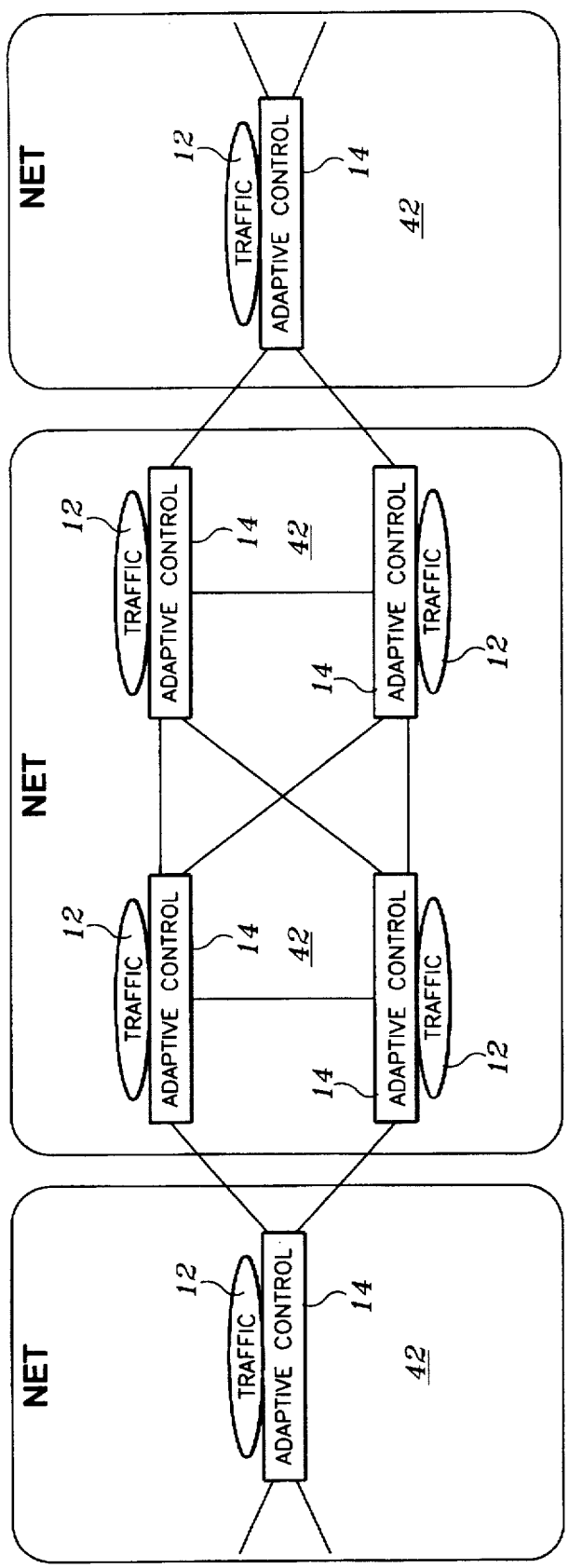
FIG. 2 is a block diagram of a network utilizing the present system.

FIG. 2 illustrates a network of four terminals 42, each of which consists of a traffic channel 12 and a control channel 14. As traffic is received at traffic controller 20, the destination node is passed to network controller via link 38. Network controller 30 utilizes propagation analysis data to select the best receive frequency at the originating node. Network controller 30 then signals a control packet requesting this frequency for a specified traffic radio 24 to use at the far end of its transmit frequency. The responding terminal's network controller 30 selects its best receive frequency from its propagation data base and sends this frequency information in a control acknowledge packet to the originating terminal 42. This transmission is acknowledged by the originating terminal 42 so that both receive and transmit ends now know what receive and transmit frequencies to utilize for the traffic link to be formed by specific radios 24. The propagation data base and protocol used to ensure that the control packets are correctly received at both transmit and receive ends is described in U.S. Pat. No. 4,937,822.

Other parameters specific to the control packets include initial transmit power settings, voice or data mode, waveform, and data rate. Waveform and data rate may be selected by network controller 30 based on a priori knowledge of which waveforms and data rates will provide the best throughput on channel frequencies having the propagation characteristics of the frequencies selected. Waveforms may also be selected by traffic controller 20 thereby forcing a particular waveform and data rate selection to achieve interoperability. If the waveform and data rate selection is made by traffic controller 20, the initial control packets will contain specification for all additional parameters as well as frequency. If the selection is made by network controller 30, each end of the communications system can independently select the waveform best suited for reception on traffic channel 14. This selection is contained in the initial control packets.

If the communications system is not bi-directional uniform, the waveforms and data rates may be different for transmit and receive. In this instance, traffic modems 22 are instructed to change waveforms by traffic controller 20 as it switches from transmit to receive.

Following the last control packet exchange required to coordinate the traffic link parameters, the network controllers 30 at both ends of the communications system, select a time to switch the equipment and pass this time to the traffic controller 20 to actually implement. Fixed delays, such as the time required to execute a change to traffic channel 12 equipment by traffic controller 20 are accounted for by system software using a terminal characteristics data base. Each node utilizes an accurate time of day subsystem for frequency hopping, and therefore transfer of control commands to traffic channel 12 equipment will occur at the exact time at both ends of the communications system, and traffic channel 12 is ready to pass traffic on execution.

As traffic channel 12 is used, link quality analysis data measured by traffic modems 22 is available. This data is available to traffic controller 20 which sends this data to network controller 30, along with information about the automatic repeat request, number of repeats, and block size adjustments. This data is used by network controller 30 to monitor the link's performance and determine when to take corrective actions. Network controller 30 will continue to probe other frequencies between the two ends of the system to find propagating frequencies for later use. As better new frequencies are found and/or current traffic frequencies degrade, network controller 30 automatically coordinates the new traffic frequency selection utilizing control channel 14. Also data rates and power levels are automatically adjusted if necessary utilizing control channel 14.

The need to adapt traffic link parameters will be determined largely by how long the link is needed. For some applications, the link may be utilized for twenty-four hours per day, in which case adaptation will be needed. If network controller 30 determines that the frequency, data rate, power, or waveform need to be changed to maintain the best link, network controller 30 uses the control channel 14 to coordinate such changes. If the link is used for voice, the frequency will be changed automatically to maintain the best connection. Once coordinated in a positive manner, the changes scheduled to take place at both ends of the communications system simultaneously so that the change will not affect normal traffic flow. When the link is up sufficiently to detect improvements in propagation, network controller 30 will adapt parameters to achieve a higher data rate.

It therefore can be seen that the present communications system utilizes one or more radio terminals per adaptive terminal with one channel dedicated to adaptive control and the remaining channels dedicated to user traffic. The adaptive control channel provides the link quality analysis and signaling and coordination necessary to maintain the frequency, data rate, waveform, and power of the traffic channels as well as the control channel. The control channel utilizes a time division multiple access network structure for a signalling function for the traffic channel while the traffic channel uses unstructured point to point links or broadcast links, as dictated by traffic flow requirements.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A system for establishing and maintaining radio communication between nodes in a network of nodes operating in a packet message mode having message packets with associated control information including frequency, power level and data rate, comprising:

a dedicated point to point user traffic channel for transmitting user voice and data in the network and no control information;

a dedicated time division multiple access control channel independent of said user traffic channel for adaptively establishing end to end signaling within the network between multiple nodes to establish multiple communications links in the network and maintaining user traffic sessions between the nodes in the network, and simultaneously adjusting the frequency, power level and data rate of message packets on said user traffic channel independently for each of said links to an optimum value while maintaining a given minimum message quality said control channel selecting frequencies that are not in use in the network and switching between frequencies to select an optimum frequency for each of said links; and means for interconnecting said user traffic channel and said control channel.

2. A radio communications system, comprising:

a plurality of nodes arranged in a network, each of said plurality of nodes having neighboring, intervening and non-neighboring nodes operating in a packet message mode having message packets with associated control information including frequency, power level and data rate;

a plurality of user traffic channels for transmitting user voice and data including real time and non-real time data and no control information over multiple communications links in said network between neighboring and non-neighboring nodes simultaneously in said network;

a control channel independent of said user traffic channels for adaptively establishing and maintaining user traffic sessions on each of said links between said neighboring and non-neighboring nodes without a requirement for relaying voice and real time data between intervening nodes while allowing non-real time data to be relayed through intervening modes, and simultaneously adjusting the frequency, power level and data rate of message packets on said user traffic channels to an optimum value on each of said links while maintaining a given minimum message quality said control channel selecting frequencies that are not in use in the network and switching between frequencies to select an optimum frequency for each of said links; and means for interconnecting said user traffic channels and said control channel.

3. The system of claim 2 wherein each of said plurality of traffic channels includes a dedicated point to point channel and said control channel includes a dedicated time division multiple access channel.

* * * * *